(12) United States Patent
Mason

(10) Patent No.: US 9,794,131 B2
(45) Date of Patent: Oct. 17, 2017

(54) FILE, COMMAND, AND AIRPLANE DATA TRANSFER TOOL

(71) Applicant: The Boeing Company, Chicago, IL (US)

(72) Inventor: Cory Charles Mason, Burien, WA (US)

(73) Assignee: The Boeing Company, Chicago, IL (US)

( * ) Notice: Subject to any disclaimer, the term of this patent is extended or adjusted under 35 U.S.C. 154(b) by 752 days.

(21) Appl. No.: 14/265,839

(22) Filed: Apr. 30, 2014

(65) Prior Publication Data

US 2017/0019309 A1    Jan. 19, 2017

(51) Int. Cl.

| | | |
|---|---|---|
| G06F 15/16 | (2006.01) | |
| H04L 12/24 | (2006.01) | |
| G05B 17/02 | (2006.01) | |
| B64F 5/60 | (2017.01) | |
| H04L 12/18 | (2006.01) | |
| H04L 29/08 | (2006.01) | |

(52) U.S. Cl.
CPC .............. *H04L 41/145* (2013.01); *B64F 5/60* (2017.01); *G05B 17/02* (2013.01); *H04L 12/18* (2013.01); *H04L 67/06* (2013.01); *H04L 67/12* (2013.01); *G05B 2219/23446* (2013.01)

(58) Field of Classification Search
CPC ... H04L 41/22; H04L 43/0894; H04L 41/145; G06F 15/16
USPC ........................... 709/220, 230; 370/462, 390
See application file for complete search history.

(56) References Cited

U.S. PATENT DOCUMENTS

| | | | |
|---|---|---|---|
| 5,023,791 A | 6/1991 | Herzberg et al. | |
| 5,260,874 A | 11/1993 | Berner et al. | |
| 6,490,293 B1* | 12/2002 | Barker | H04L 12/417 370/462 |
| 6,731,331 B1* | 5/2004 | Watabe | H04N 7/185 348/144 |
| 9,405,009 B2* | 8/2016 | Rao | G01S 19/02 |
| 2002/0029099 A1* | 3/2002 | Gardner | B64D 45/0015 701/3 |
| 2002/0035415 A1* | 3/2002 | Gardner | B64D 45/0015 701/3 |
| 2006/0106939 A1* | 5/2006 | Cha | H04L 12/185 709/230 |
| 2006/0181454 A1* | 8/2006 | Nichols | G01C 15/004 342/357.28 |
| 2007/0076716 A1* | 4/2007 | Jang | H04N 21/235 370/390 |

(Continued)

FOREIGN PATENT DOCUMENTS

| | | |
|---|---|---|
| WO | WO 2009/068067 A1 | 6/2009 |
| WO | WO 2012/166591 A1 | 12/2012 |

OTHER PUBLICATIONS

European Patent Application No. 15163526.5; Extended Search Report; dated Oct. 2, 2015; 7 pages.

*Primary Examiner* — Tesfay Yohannes
(74) *Attorney, Agent, or Firm* — Gates & Cooper LLP

(57) ABSTRACT

A computing system is configured to simulate one or more onboard aircraft systems. Packets or data is generated at the computing system in a format used by onboard systems and transmitted to an aircraft system under test. Response data may be received from the system under test. Results are provided to users and/or logged to evaluate the performance of the system under test.

15 Claims, 3 Drawing Sheets

(56) References Cited

U.S. PATENT DOCUMENTS

| | | | |
|---|---|---|---|
| 2010/0111165 A1* | 5/2010 | Kim | H04N 21/234327 375/240.08 |
| 2011/0276223 A1* | 11/2011 | Gowan | B60T 8/1703 701/33.4 |
| 2012/0008697 A1* | 1/2012 | Emonide | H04L 12/40006 375/259 |

* cited by examiner

FILE, COMMAND, AND AIRPLANE DATA TRANSFER TOOL

BACKGROUND

Systems used in aircraft must be thoroughly tested and verified to ensure proper functioning. However, various aircraft systems may be in simultaneous development, and therefore it may be difficult or impossible to test one system under development for proper interaction with another system that is also under development. Even when testing with established aircraft systems is needed, is may be costly and time-consuming to bring actual aircraft systems into a lab environment to perform testing with a system under development.

SUMMARY

Illustrative examples of the present invention include, without limitation, a method, device, and computer-readable storage medium. In one aspect, a method for testing an aircraft system includes generating aircraft system data at a computing system that is not an aircraft system and transmitting the aircraft system data an aircraft system under test. Response data may be received from the aircraft system under test and provided to a user and/or logged.

In another aspect, a computing system that is not an aircraft system may include a memory with instructions and a processor coupled to the memory that, when executing the instructions, performs operations such as generating aircraft system data, transmitting the aircraft system data to an aircraft system under test, receiving response data from the aircraft system under test, and providing results data and/or logging the results data.

In another aspect, a computer-readable storage device may have computer-readable instructions stored thereon that, when executed by a processor, cause the processor to effectuate operations such generating aircraft system data, transmitting the aircraft system data to an aircraft system under test, receiving response data from the aircraft system under test, and providing results data and/or logging the results data.

Other features of the inventive systems and methods are described below. The features, functions, and advantages can be achieved independently in various examples or may be combined in yet other examples, further details of which can be seen with reference to the following description and drawings.

BRIEF DESCRIPTION OF DRAWINGS

Examples of techniques in accordance with the present disclosure are described in detail below with reference to the following illustrations.

DETAILED DESCRIPTION

In an example of the disclosed subject matter, a computing system may be used to simulate onboard aircraft systems for testing one or more aircraft systems under development. Various functions that may be emulated by such a computing system include file transfers, transmission and reception of multicast data, and time and date determinations based on detected data traffic.

Figure 1:
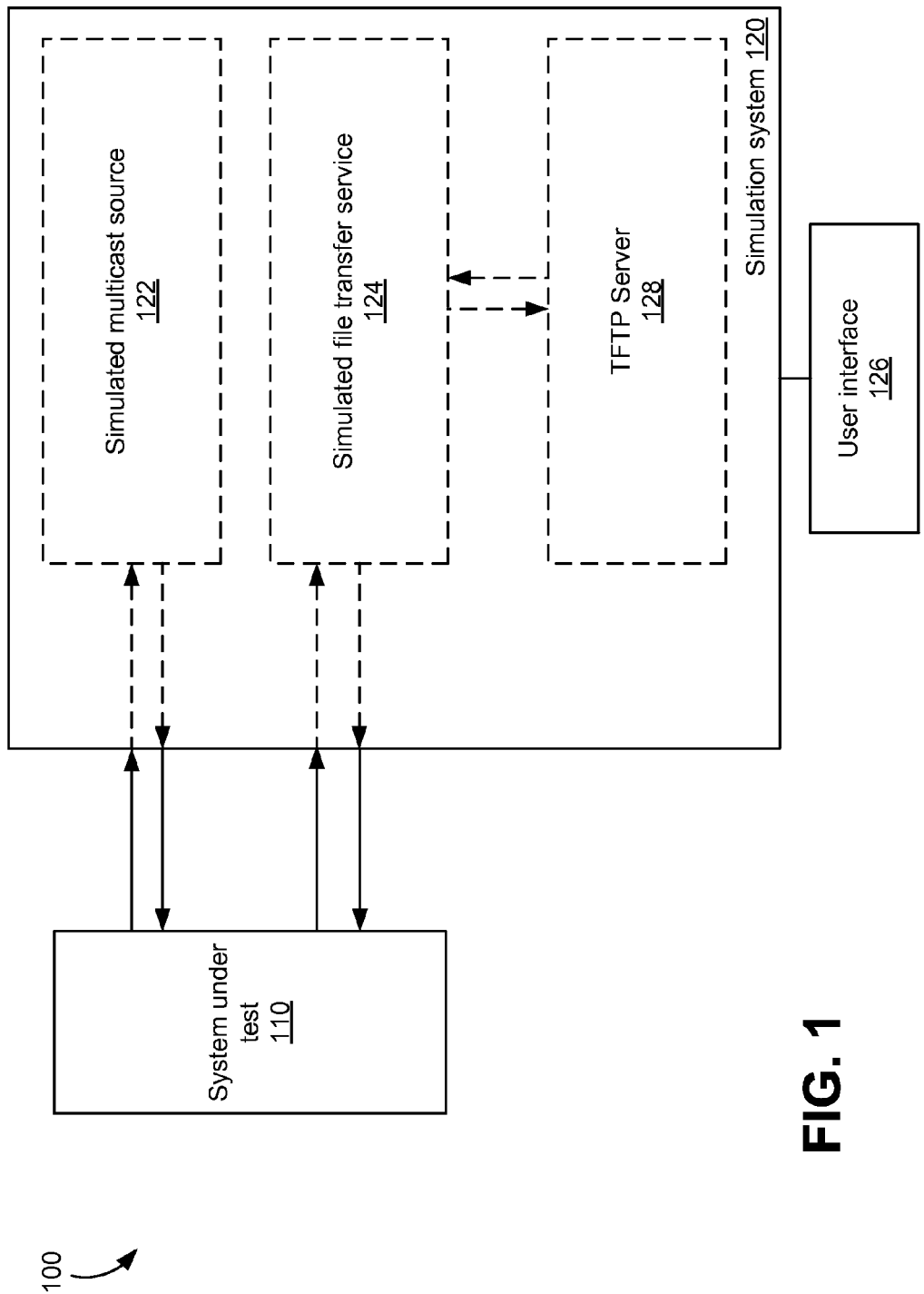
FIG. 1 depicts an exemplary simulation system and various components that may be used to test an aircraft system.

FIG. 1 illustrates a block diagram of exemplary, non-limiting system 100 for testing an aircraft system under development with a simulation system as disclosed. System under test 110 may be any aircraft system under development or undergoing testing for any reason that consumes or otherwise receives and/or transmits data to one or more other aircraft systems. System under test 110 may be software, hardware, or a combination of software and hardware, and may be configured to perform any function(s) that may be performed by an aircraft system.

Simulation system 120 may be any computing device or system, or any number and combination of any types of computing devices and/or systems. In an example, Simulation system 120 may be a desktop computing device or a server computing device that is typically used in a ground-based system rather than a computing device designed and/or constructed for use in an aircraft. Input may be provided to simulation system 120 by user interface 126, which may be any type of user interface that allows a user to manipulate software and other components configured and/or executing on simulation system 120. Output from simulation system 120 may be provided to a user by user interface 126 in any form or manner, including those disclosed herein. Additional details regarding some contemplated example computing systems may be found in FIG. 4 and text associated therewith. System under test 110 may communicate with simulation system 120 using any means and methods. While two sets of communication indicators are shown in FIG. 1, it is contemplated that in some examples, all communication between system under test 110 and simulation system 120 may be accomplished using any one or more communicative connection means, including wired and wireless communicative connections.

Executing on simulation system 120 may be simulated multicast source 122 that may be any software, hardware, or combination thereof configured to transmit multicast packets to system under test 110 and in some examples, receive packets or other communications from system under test 110. Simulated multicast source 122 may be controlled, configured, or otherwise manipulated by a user using user interface 126. In one example, simulated multicast source 122 may emulate one or more functions of a Central Maintenance Computing Function (CMCF) that may be installed in an aircraft.

An important requirement for onboard systems may be having access to a correct date and/or time. In some examples, date and time information may be gathered from multicast packets that may be transmitted by a CMCF. In simulating such packets, simulated multicast source 122 allows testing of system under test 110's response to and interaction with such data. Via user interface 126, a user may manipulate simulated multicast source 122 to generate packets with user-specified data contained therein. For example, the date and time information in such packets may be adjusted to reflect a particular date and time so as to test system under test 110's operation at that date and time. Also, packets with incorrect data or errors may be generated and sent to system under test 110 to testing system under test 110's response to such errors and incorrect data.

Figure 2:
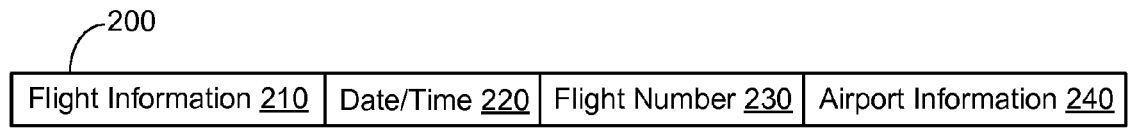
FIG. 2 depicts an exemplary packet.

In an example, data transmitted from simulated multicast source 122 may be messages in the Aeronautical Radio, Incorporated (ARINC) A664 protocol. FIG. 2 illustrates exemplary ARINC A664 packet 200 that may be used in some examples. Various information may be contained in such a packet, and, for explanatory purposes, all possible fields are not shown in FIG. 2. Additional fields are contemplated, as are packets with fewer fields. Any number of bits may be used to for each field represented in FIG. 2.

Packet 200 may include content such as flight information 210 that may include any type of flight information, such as flight phase, flight leg number, etc. The content of packet 200 may also include date/time 220 that may include an indication of a time, in some examples, including indications of the hour, minute, and second, as well as indications of a year, month, and day. The content of packet 200 may also include flight number 230 that may include an indication of the flight number of the current (simulated) flight. The content of packet 200 may also include airport information 240 that may include an indication of a departure airport and an arrival airport. Any number of packets such as packet 200 may be transmitted by simulated multicast source 122 to system under test 110. The data and/or content contained or indicated in packet 200 may be presented or indicated in packet 200 in any form or format. All such examples are contemplated as within the scope of the present disclosure.

Simulated multicast source 122, executing on simulation system 120, may allow a user to manipulate any of the fields of packet 200 or any other field of any type of packet that may be generated by simulated multicast source 122. For example, date/time 220 may be manipulated to generate any date and time desired by the user, flight information 210 and flight number 230 may be manipulated to reflect any desired flight data, and airport information 240 may be manipulated to reflect any desired arrival and departure airports. All such fields may be configured by a user to reflect correctly simulated data and may be manipulated to have incorrect data or data unintelligible to system under test 110 to test system under test 110's response to "garbage" data and any other error responses.

Referring again to FIG. 1, simulation system 120 may be configured with simulated file transfer service 124 that may be configured to simulate a file transfer service configured onboard an aircraft. Simulated file transfer service 124 may generate and transmit one or more files of any type in any protocol to system under test 110. Simulated file transfer service 124 may also receive and evaluate any response received from system under test 110, and may receive file transfers from system under test 110. This functionality allows testing of file transfers and file downloading and uploading between system under test 110 and other aircraft systems. In one example, simulated file transfer service 124 may simulate a file transfer service (FTS) component of a crew information system/maintenance system (CIS/MS) that may configured onboard an aircraft.

Upon receipt of data, such as acknowledgment of receipt of multicast packets or file transfer data, from system under test 110, simulation system 120 may evaluate the received data to determine if the received data indicates an appropriate response. Alternatively, or in addition, simulation system 120 may report the data received to a user via user interface 126, in some examples, formatting such data that is it more user-readable. In some examples, simulation system 120 may provide the cumulative results of testing that included the transmission and/or receipt of several packets or multicast traffic and/or file transfer data. Any evaluation of the performance of system under test 110 and the reporting of the results of such evaluations are contemplated as within the scope of the present disclosure.

Also configured at simulation system 120 may be Trivial File Transfer Protocol (TFTP) server 128 that may be used to store files that may be used by simulated file transfer service 124 to simulate a file transfer service. TFTP server 128 may also log the file and data transfers and the interactions between simulation system 120 and system under test 110 for future reference by users so that the performance of system under test 110 may be evaluated.

Figure 3:
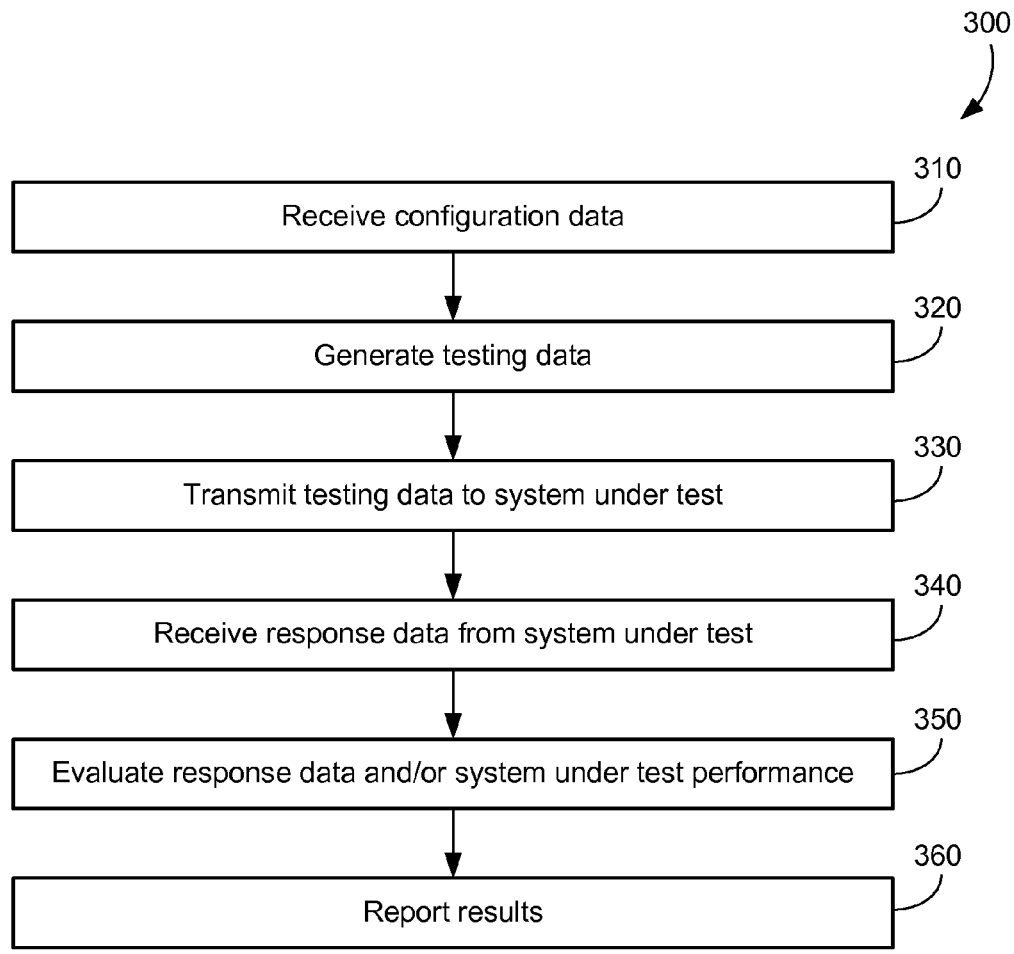
FIG. 3 depicts an exemplary method of implementing a disclosed simulation system.

FIG. 3 illustrates exemplary, non-limiting method 300 of implementing an example of the subject matter disclosed herein. Method 300, and the individual actions and functions described in method 300, may be performed by any one or more devices, including those described herein. In an example, method 300 may be performed by a device such as simulation system 120, in some examples in conjunction with software configured and/or executing on the device. Note that any of the functions and/or actions described in regard to any of the blocks of method 300 may be performed in any order, in isolation, with a subset of other functions and/or actions described in regard to any of the other blocks of method 300 or any other method described herein, and in combination with other functions and/or actions, including those described herein and those not set forth herein. Processor-executable instructions for performing some or all of method 300 may be stored in a memory or other storage device accessible by a processor, such as any processor described herein or otherwise, and may be executed by such a processor to create a device implementing an example of the present disclosure. All such examples are contemplated as within the scope of the present disclosure.

At block 310, configuration data may be received by a simulation system. This may be simply loading a default configuration for the simulation system. Alternatively, or in addition, a configuration of a simulation system may be loaded from a data file or received as manual user input via a user interface to the simulation system. Such configuration data may include flight data (e.g., leg, phase), flight number information, airport information, data/time information, a file to be transferred, etc. Any type of testing configuration may be configured at a simulation system, and all such examples are contemplated as within the scope of the present disclosure.

At block 320, testing data may be generated. This may include generating packets, such as ARINC A664 packets, and any encapsulation and other data and operations that may be performed to prepare testing data for delivery to a system under test. At block 330, this testing data may be transmitted to the system under test using any means, including wired and wireless transmission means. At block 340, response data may be received from the system under test, such as acknowledgements or files being uploaded by the system under test.

At block 350, received response data may be evaluated to determine the performance of the system under test. Alternatively, or in addition, any other means of evaluating the system under test may be used. At block 360, the results of such evaluations may be provided to a user via, for example, a user interface. This reporting may take the form of raw data received from the system under or formatted and/or compiled data reflecting a series of testing packets or data that may be presented in a user-friendly manner. Alternatively, or in addition, data may be written to a log file for evaluation by a user at a later time.

It will be appreciated that, while processor-executable instructions are described as being stored in memory or on storage while being used, these instructions or portions of them may be transferred between memory and other storage devices. Alternatively, in other examples some or all of the instructions may execute in memory on another device and communicate with the described systems via inter-computer communication. In some examples, some or all of the systems and/or instructions may be implemented or provided in other ways, such as at least partially in firmware and/or hardware, including, but not limited to, one or more ASICs, standard integrated circuits, controllers (e.g., by executing appropriate instructions, and including microcontrollers and/or embedded controllers), FPGAs, complex programmable logic devices (CPLDs), etc. Some or all of the instructions, systems and data structures may also be stored (e.g., as software instructions or structured data) on a computer-readable medium, such as a hard disk, a memory, a network, or a portable media article to be read by an appropriate drive or via an appropriate connection. The systems, instructions, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other examples. Accordingly, the present invention may be practiced with other computer system configurations.

In some examples, a system memory may be used that is a computer-readable storage medium configured to store program instructions and data as described above for FIGS. 1-3 for implementing examples of the corresponding methods and apparatus. However, in other examples, program instructions and/or data may be received, sent or stored upon different types of computer-accessible media. Generally speaking, a computer-readable storage medium may include non-transitory and tangible storage media or memory media such as magnetic or optical media, e.g., disk or DVD/CD coupled to a computer system or gateway device. A computer-readable storage medium may also include any volatile or non-volatile media such as RAM (e.g., SDRAM, DDR SDRAM, RDRAM, SRAM, etc.), ROM, etc., that may be included in some examples of the computer systems described above as system memory or another type of memory. Portions or all of the systems such as those illustrated herein may be used to implement the described functionality in various examples. For example, software components running on a variety of different devices and servers may collaborate to provide the disclosed functionality.

It will be appreciated that in some examples the functionality provided by the routines discussed above may be provided in alternative ways, such as being split among more routines or consolidated into fewer routines. Similarly, in some examples, illustrated routines may provide more or less functionality than is described, such as when other illustrated routines instead lack or include such functionality respectively or when the amount of functionality that is provided is altered. In addition, while various operations may be illustrated as being performed in a particular manner (e.g., in serial or in parallel) and/or in a particular order, in other examples the operations may be performed in other orders and in other manners. Similarly, the data structures discussed above may be structured in different ways in other examples, such as by having a single data structure split into multiple data structures or by having multiple data structures consolidated into a single data structure, and may store more or less information than is described (e.g., when other illustrated data structures instead lack or include such information respectively, or when the amount or types of information that is stored is altered).

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

In general, the various features and processes described above may be used independently of one another, or may be combined in different ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example examples. The example systems and components described herein may be configured differently than described. For example, elements may be added to, removed from, or rearranged compared to the disclosed example examples.

Although not required, the methods and systems disclosed herein for file transfer and multicast simulation may be described in the general context of computer-executable instructions, such as program modules, being executed by a computer, such as a client workstation, server, programmable processor, or personal computer. Such computer-executable instructions may be stored on any type of computer-readable storage device that is not a transient signal per se. Generally, program modules include routines, programs, objects, components, data structures and the like that perform particular tasks or implement particular abstract data types. Moreover, it should be appreciated that the methods and systems for file transfer and multicast simulation disclosed herein and/or portions thereof may be practiced with other computer system configurations, including hand-held devices, multi-processor systems, microprocessor-based or programmable consumer electronics, network PCs, minicomputers, mainframe computers and the like. The methods and systems for file transfer and multicast simulation disclosed herein may also be practiced in distributed computing environments where tasks are performed by remote processing devices that are linked through a communications network. In a distributed computing environment, program modules may be located in both local and remote memory storage devices.

Figure 4:
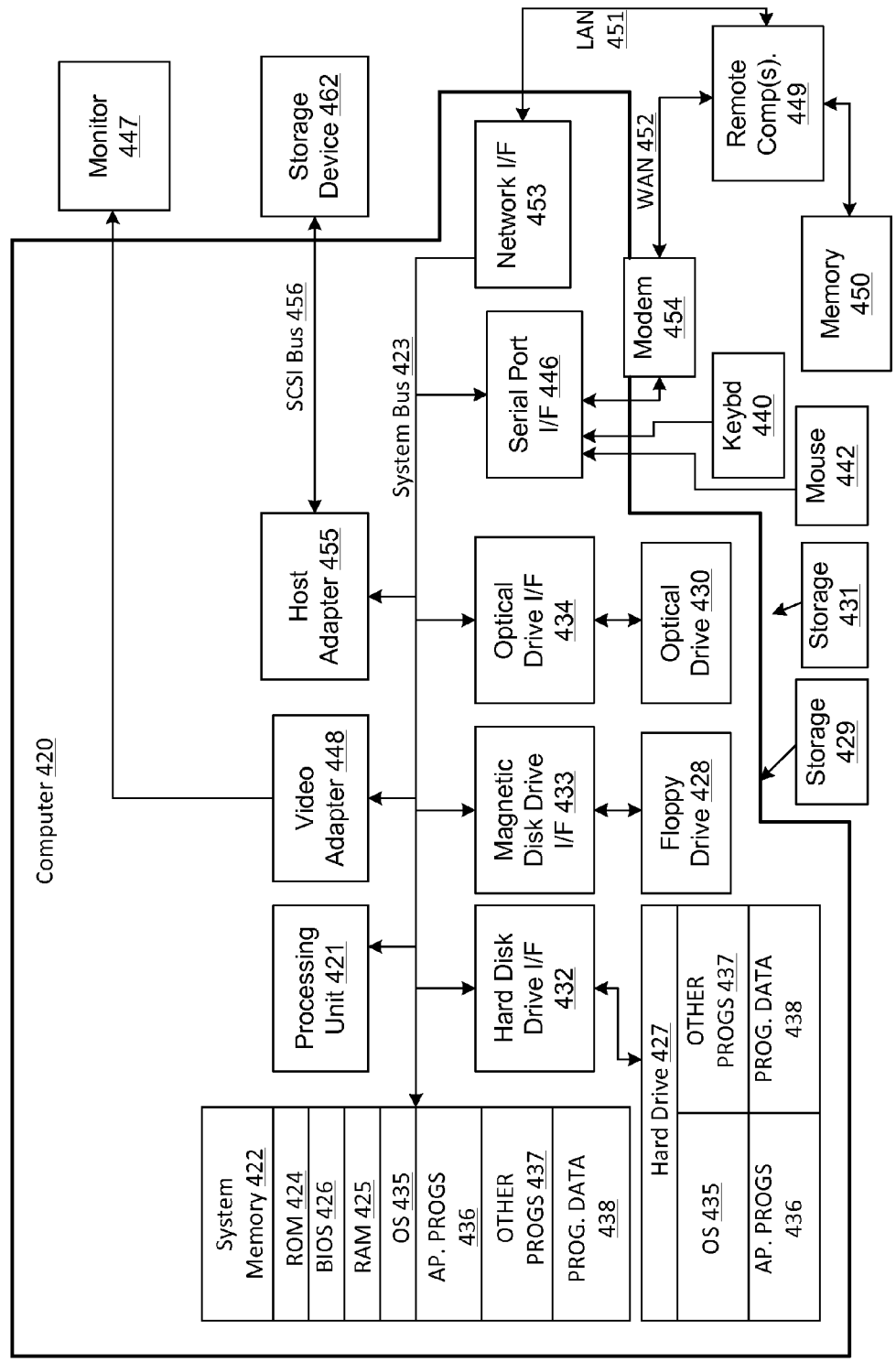
FIG. 4 depicts an example computing environment in which examples of the disclosed subject matter may be performed.

FIG. 4 is a block diagram representing a general purpose computer system in which aspects of the methods and systems for file transfer and multicast simulation disclosed herein and/or portions thereof may be incorporated. As shown, the exemplary general purpose computing system includes computer 420 or the like, including processing unit 421, system memory 422, and system bus 423 that couples various system components including the system memory to processing unit 421. System bus 423 may be any of several types of bus structures including a memory bus or memory controller, a peripheral bus, and a local bus using any of a variety of bus architectures. The system memory may include read-only memory (ROM) 424 and random access memory (RAM) 425. Basic input/output system 426 (BIOS), which may contain the basic routines that help to transfer information between elements within computer 420, such as during start-up, may be stored in ROM 424.

Computer 420 may further include hard disk drive 427 for reading from and writing to a hard disk (not shown), magnetic disk drive 428 for reading from or writing to removable magnetic disk 429, and/or optical disk drive 430 for reading from or writing to removable optical disk 431 such as a CD-ROM or other optical media. Hard disk drive 427, magnetic disk drive 428, and optical disk drive 430 may be connected to system bus 423 by hard disk drive interface 432, magnetic disk drive interface 433, and optical drive interface 434, respectively. The drives and their associated computer-readable media provide non-volatile storage of computer-readable instructions, data structures, program modules and other data for computer 420.

Although the example environment described herein employs a hard disk, removable magnetic disk 429, and removable optical disk 431, it should be appreciated that other types of computer-readable media that can store data that is accessible by a computer may also be used in the exemplary operating environment. Such other types of media include, but are not limited to, a magnetic cassette, a flash memory card, a digital video or versatile disk, a Bernoulli cartridge, a random access memory (RAM), a read-only memory (ROM), and the like.

A number of program modules may be stored on hard disk drive 427, magnetic disk 429, optical disk 431, ROM 424, and/or RAM 425, including an operating system 435, one or more application programs 436, other program modules 437 and program data 438. A user may enter commands and information into the computer 420 through input devices such as a keyboard 440 and pointing device 442. Other input devices (not shown) may include a microphone, joystick, game pad, satellite disk, scanner, or the like. These and other input devices are often connected to the processing unit 421 through a serial port interface 446 that is coupled to the system bus, but may be connected by other interfaces, such as a parallel port, game port, or universal serial bus (USB). A monitor 447 or other type of display device may also be connected to the system bus 423 via an interface, such as a video adapter 448. In addition to the monitor 447, a computer may include other peripheral output devices (not shown), such as speakers and printers. The exemplary system of FIG. 4 may also include host adapter 455, Small Computer System Interface (SCSI) bus 456, and external storage device 462 that may be connected to the SCSI bus 456.

The computer 420 may operate in a networked environment using logical and/or physical connections to one or more remote computers or devices, such as remote computer 449, that may represent any remote computer or device with which computer 420 may communicate. Remote computer 449 may be a personal computer, a server, a router, a network PC, a peer device or other common network node, and may include many or all of the elements described above relative to the computer 420, although only a memory storage device 450 has been illustrated in FIG. 4. The logical connections depicted in FIG. 4 may include local area network (LAN) 451 and wide area network (WAN) 452. Such networking environments are commonplace in police and military facilities, offices, enterprise-wide computer networks, intranets, and the Internet.

When used in a LAN networking environment, computer 420 may be connected to LAN 451 through network interface or adapter 453. When used in a WAN networking environment, computer 420 may include modem 454 or other means for establishing communications over wide area network 452, such as the Internet. Modem 454, which may be internal or external, may be connected to system bus 423 via serial port interface 446. In a networked environment, program modules depicted relative to computer 420, or portions thereof, may be stored in a remote memory storage device. It will be appreciated that the network connections shown are exemplary and other means of establishing a communications link between computers may be used.

Computer 420 may include a variety of computer-readable storage media. Computer-readable storage media can be any available tangible, non-transitory, or non-propagating media that can be accessed by computer 420 and includes both volatile and nonvolatile media, removable and non-removable media. By way of example, and not limitation, computer-readable media may comprise computer storage media and communication media. Computer storage media include volatile and nonvolatile, removable and non-removable media implemented in any method or technology for storage of information such as computer-readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium that can be used to store the desired information and that can be accessed by computer 420. Combinations of any of the above should also be included within the scope of computer-readable media that may be used to store source code for implementing the methods and systems described herein. Any combination of the features or elements disclosed herein may be used in one or more examples.

It will be appreciated that, while processor-executable instructions are described as being stored in memory or on storage while being used, these instructions or portions of them may be transferred between memory and other storage devices. Alternatively, in other examples some or all of the instructions may execute in memory on another device and communicate with the described systems via inter-computer communication. In some examples, some or all of the systems and/or instructions may be implemented or provided in other ways, such as at least partially in firmware and/or hardware, including, but not limited to, one or more ASICs, standard integrated circuits, controllers (e.g., by executing appropriate instructions, and including microcontrollers and/or embedded controllers), FPGAs, complex programmable logic devices (CPLDs), etc. Some or all of the instructions, systems and data structures may also be stored (e.g., as software instructions or structured data) on a computer-readable medium, such as a hard disk, a memory, a network, or a portable media article to be read by an appropriate drive or via an appropriate connection. The systems, instructions, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other examples. Accordingly, the present invention may be practiced with other computer system configurations.

In some examples, a system memory may be used that is a computer-readable storage medium configured to store program instructions and data as described above for FIGS. 1-3 for implementing examples of the corresponding methods and systems for file transfer and multicast simulation. However, in other examples, program instructions and/or data may be received, sent or stored upon different types of computer-accessible media. Generally speaking, a computer-readable storage medium may include non-transitory and tangible storage media or memory media such as magnetic or optical media, e.g., disk or DVD/CD coupled to a computer system or gateway device. A computer-readable storage medium may also include any volatile or non-volatile media such as RAM (e.g., SDRAM, DDR SDRAM, RDRAM, SRAM, etc.), ROM, etc., that may be included in some examples of the computer systems described above as system memory or another type of memory. Portions or all of the systems such as those illustrated herein may be used to implement the described functionality in various examples. For example, software components running on a variety of different devices and servers may collaborate to provide the disclosed functionality.

It will be appreciated that in some examples the functionality provided by the routines discussed above may be provided in alternative ways, such as being split among more routines or consolidated into fewer routines. Similarly, in some examples, illustrated routines may provide more or less functionality than is described, such as when other illustrated routines instead lack or include such functionality respectively or when the amount of functionality that is provided is altered. In addition, while various operations may be illustrated as being performed in a particular manner (e.g., in serial or in parallel) and/or in a particular order, in other examples the operations may be performed in other orders and in other manners. Similarly, the data structures discussed above may be structured in different ways in other examples, such as by having a single data structure split into multiple data structures or by having multiple data structures consolidated into a single data structure, and may store more or less information than is described (e.g., when other illustrated data structures instead lack or include such information respectively, or when the amount or types of information that is stored is altered).

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

In general, the various features and processes described above may be used independently of one another, or may be combined in different ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example examples. The example systems and components described herein may be configured differently than described. For example, elements may be added to, removed from, or rearranged compared to the disclosed example examples.

While certain example or illustrative examples have been described, these examples have been presented by way of example only, and are not intended to limit the scope of the inventions disclosed herein. Indeed, the novel methods and systems described herein may be embodied in a variety of other forms. The accompanying claims and their equivalents are intended to cover such forms or modifications as would fall within the scope and spirit of certain of the inventions disclosed herein.

The invention claimed is:

1. A method for simulating an onboard aircraft system, the method comprising:
    generating aircraft system data at a computing system that is not an aircraft system;
    transmitting the aircraft system data from the computing system that is not the aircraft system to an aircraft system under test, wherein the aircraft system data comprises at least one multicast packet;
    receiving response data from the aircraft system under test at the computing system that is not the aircraft system; and
    providing results data at the computing system that is not the aircraft system;
    wherein the step of generating aircraft system data comprises receiving an instruction indicating content of the aircraft system data, and generating the aircraft system data based on the instruction; and
    wherein the content of the aircraft system data comprises at least one of flight information, date, time, flight number, or airport information.

2. The method of claim 1, wherein the aircraft system data comprises at least one packet on an Aeronautical Radio, Incorporated (ARINC) A664 protocol.

3. The method of claim 1, further comprising logging results of the aircraft system data transmission at the computing system that is not the aircraft system.

4. The method of claim 1, wherein the aircraft system data comprises file transfer data.

5. A computing system that is not an aircraft system, the computing system configured to simulate an aircraft system, the computing system comprising:
a memory comprising instructions;
a processor coupled to the memory, wherein the processor, when executing the instructions, performs operations comprising:
generating aircraft system data;
transmitting the aircraft system data to an aircraft system under test;
receiving response data from the aircraft system under test; and
providing results data;
wherein the operation of generating aircraft system data comprises receiving an instruction indicating content of the aircraft system data, and generating the aircraft system data based on the instruction; and wherein the content of the aircraft system data comprises at least one of flight information, date, time, flight number, or airport information.

6. The computing system of claim 5, wherein the aircraft system data comprises at least one multicast packet.

7. The computing system of claim 5, wherein the aircraft system data comprises at least one packet on an Aeronautical Radio, Incorporated (ARINC) A664 protocol.

8. The computing system of claim 5, wherein the operations further comprise logging results of the aircraft system data transmission at the computing system.

9. The computing system of claim 5, wherein the aircraft system data comprises file transfer data.

10. A non-transitory computer-readable medium having computer-readable instructions stored thereon, the computer-readable instructions comprising instructions that, when executed by a processor, cause the processor to effectuate operations comprising:
generating aircraft system data;
transmitting the aircraft system data to an aircraft system under test;
receiving response data from the aircraft system under test; and
providing results data;
wherein the operation of generating aircraft system data comprises receiving an instruction indicating content of the aircraft system data, and generating the aircraft system data based on the instruction; and wherein the content of the aircraft system data comprises at least one of flight information, date, time, flight number, or airport information.

11. The non-transitory computer-readable medium of claim 10, wherein the aircraft system data comprises at least one multicast packet.

12. The non-transitory computer-readable medium of claim 10, wherein the aircraft system data comprises at least one packet on an Aeronautical Radio, Incorporated (ARINC) A664 protocol.

13. The non-transitory computer-readable medium of claim 10, wherein the operations further comprise receiving an instruction indicating content of the aircraft system data, and generating the aircraft system data based on the instruction.

14. The non-transitory computer-readable medium of claim 13, wherein the content of the aircraft system data comprises at least one of flight information, date, time, flight number, or airport information.

15. The non-transitory computer-readable medium of claim 10, wherein the operations further comprise logging results of the aircraft system data transmission at a computing system that is not the aircraft system.

* * * * *